United States Patent
Juban

(10) Patent No.: US 11,794,847 B2
(45) Date of Patent: Oct. 24, 2023

(54) HANDLEBAR STEM WITH INTEGRATED CABLE GUIDANCE

(71) Applicant: SCOTT Sports SA, Givisiez (CH)

(72) Inventor: William Juban, Bulle (CH)

(73) Assignee: SCOTT SPORTS SA, Givisiez (CH)

( * ) Notice: Subject to any disclaimer, the term of this patent is extended or adjusted under 35 U.S.C. 154(b) by 739 days.

(21) Appl. No.: 16/984,998

(22) Filed: Aug. 4, 2020

(65) Prior Publication Data

US 2021/0061399 A1 Mar. 4, 2021

(30) Foreign Application Priority Data

Aug. 29, 2019 (DE) ...................... 20 2019 104 749.6

(51) Int. Cl.
| | | |
|---|---|---|
| *B62K 21/12* | (2006.01) | |
| *B62J 11/10* | (2020.01) | |
| *B62K 3/00* | (2006.01) | |

(52) U.S. Cl.
CPC ............... *B62K 21/12* (2013.01); *B62J 11/10* (2020.02); *B62K 3/00* (2013.01)

(58) Field of Classification Search
CPC ........ B62K 21/12; B62K 21/125; B62J 11/10; B62J 11/18; B62J 11/20; B62J 11/22; B62J 11/24
See application file for complete search history.

(56) References Cited

U.S. PATENT DOCUMENTS

| | | | | | |
|---|---|---|---|---|---|
| 4,489,307 | A | * | 12/1984 | Nagano ................. | B62K 21/12 340/432 |
| 4,676,120 | A | * | 6/1987 | Borromeo ............. | B62K 21/12 280/280 |
| 5,095,770 | A | * | 3/1992 | Rader, III ............. | B62K 21/06 280/279 |
| 5,299,467 | A | * | 4/1994 | Marui ................... | B62K 19/24 280/279 |
| 5,678,458 | A | * | 10/1997 | Kao ....................... | B62K 21/12 280/279 |
| 5,737,974 | A | * | 4/1998 | Chen ..................... | B62K 21/12 403/374.1 |
| 6,981,413 | B2 | * | 1/2006 | Kinoshita ............. | B62K 21/12 340/432 |
| 6,983,949 | B2 | * | 1/2006 | Ueno ..................... | B62J 11/19 280/279 |
| 7,093,844 | B2 | * | 8/2006 | Horiuchi .............. | B62K 19/32 280/279 |

(Continued)

*Primary Examiner* — Daniel J Wiley
(74) *Attorney, Agent, or Firm* — Birch, Stewart, Kolasch & Birch, LLP

(57) ABSTRACT

A handlebar stem core (1) for a handlebar stem of a bicycle comprises a rear-side steer tube receptacle (1a), a front-side handlebar receptacle (1c), and a handlebar stem tube (1b) lying in between. The handlebar stem core is formed for the integrated guidance of a number n of cables (5), with n equal to 1, 2, 3, 4 or greater, and the handlebar stem core is configured for attachment to a cable central section of the number n of cables. The solution allows for guiding mechanical, hydraulic or else electrical brake and gear cables or lines proceeding from the respective operating elements at the handlebar or the handlebar ends to the bicycle frame or the head tube and/or the bicycle fork in a manner concealed from the outside with a low assembly outlay.

14 Claims, 2 Drawing Sheets

(56) References Cited

U.S. PATENT DOCUMENTS

| | | | | |
|---|---|---|---|---|
| 8,020,884 B1* | 9/2011 | Foley | | B62K 21/12 |
| | | | | 280/279 |
| 9,056,646 B1* | 6/2015 | D'Aluisio | | B62L 3/00 |
| 9,242,692 B2* | 1/2016 | Nago | | B62K 21/12 |
| 9,327,787 B1* | 5/2016 | Chen | | B62K 21/12 |
| 9,446,812 B2* | 9/2016 | Nago | | B62K 21/12 |
| 9,615,472 B1* | 4/2017 | Calfee | | B62J 11/19 |
| 10,046,825 B1* | 8/2018 | Chen | | B62K 21/24 |
| 10,926,827 B2* | 2/2021 | Süsse | | B62J 11/13 |
| 10,953,948 B2* | 3/2021 | Vandermolen | | B62L 3/02 |
| 2002/0108465 A1* | 8/2002 | Rocket | | B62K 21/125 |
| | | | | 74/551.1 |
| 2003/0230228 A1* | 12/2003 | Kinoshita | | B62K 21/12 |
| | | | | 116/28 R |
| 2005/0057017 A1* | 3/2005 | Hara | | B62K 21/12 |
| | | | | 280/279 |
| 2005/0258617 A1* | 11/2005 | Ueno | | B62M 25/02 |
| | | | | 280/280 |
| 2006/0130605 A1* | 6/2006 | Chen | | B62K 21/12 |
| | | | | 74/551.1 |
| 2006/0145446 A1* | 7/2006 | Schmider | | B62K 21/12 |
| | | | | 280/281.1 |
| 2013/0098959 A1* | 4/2013 | Onogi | | B62J 50/225 |
| | | | | 224/419 |
| 2013/0101345 A1* | 4/2013 | Wang | | B62K 21/12 |
| | | | | 403/385 |
| 2013/0240313 A1* | 9/2013 | Moore | | B62L 3/023 |
| | | | | 188/344 |
| 2015/0225035 A1* | 8/2015 | Li | | B62K 21/12 |
| | | | | 74/551.8 |
| 2015/0259023 A1* | 9/2015 | Nago | | B62M 25/08 |
| | | | | 280/279 |
| 2015/0367825 A1* | 12/2015 | D'Aluisio | | B62K 21/22 |
| | | | | 29/428 |
| 2016/0311497 A1* | 10/2016 | Wagner | | B62K 21/18 |
| 2017/0137081 A1* | 5/2017 | Wen | | B62K 23/02 |
| 2018/0118300 A1* | 5/2018 | Lin | | B62K 21/02 |
| 2018/0222546 A1* | 8/2018 | Wong | | B62K 21/22 |
| 2018/0273132 A1* | 9/2018 | Huang | | B62K 21/18 |
| 2019/0202522 A1* | 7/2019 | Huang | | B62K 11/14 |
| 2019/0233043 A1* | 8/2019 | Huang | | B62K 21/12 |
| 2019/0367122 A1* | 12/2019 | Vandermolen | | B60T 11/046 |
| 2020/0047842 A1* | 2/2020 | Clifford-Brown | | B62J 50/22 |
| 2021/0061401 A1* | 3/2021 | van Rijckevorsel | | B62J 11/10 |
| 2021/0062841 A1* | 3/2021 | Li | | F16B 2/065 |
| 2021/0276657 A1* | 9/2021 | Lin | | B62J 50/225 |
| 2021/0371041 A1* | 12/2021 | Liu | | B62K 21/18 |

* cited by examiner

HANDLEBAR STEM WITH INTEGRATED CABLE GUIDANCE

The present invention relates to a handlebar stem, a handlebar stem core, a handlebar stem core kit and a corresponding bicycle.

In bicycles, steering impulses induced at the handlebar assembly are transmitted via the handlebar, a handlebar stem and further via a force-fitting and frictionally engaging, rotationally rigid connection to the steer tube of a bicycle fork, in which a front wheel is clamped. For this purpose, the bicycle fork is mounted on the steer tube in a head tube of the bicycle frame such that it can rotate about a steering or control axis.

In recent years, the aspect of an integrated guidance of gear and brake cables between the bicycle frame and the handlebar has arisen in this respect. Here, the intention is to guide the mechanical, hydraulic or else electrical brake and gear cables or lines proceeding from the respective operating elements at the handlebar or the handlebar ends to the bicycle frame or the head tube and/or the bicycle fork in a manner concealed from the outside. This additional requirement has both technical backgrounds, such as aerodynamic optimization of the bicycle, in which the surface area of the bicycle on which the wind acts is reduced by that of the gear and brake cables, and improved protection of the cables against environmental influences, and esthetic grounds, which accommodate the desire for an "integrated" visual appearance of the bicycle.

However, the known solutions have various problems. Firstly, many solutions do not allow the use of mechanical cables, such that these solutions are only compatible with electrical or hydraulic cables or lines. Secondly, many solutions cause a relatively high assembly outlay when the handlebar stem is being fitted or exchanged. Normally, it is necessary for the cables to be disassembled at one of their ends, threaded out through the old handlebar stem and threaded in through the new handlebar stem, and then for the cables to be reassembled and realigned. In the case of hydraulic lines, there is then also the requirement of ventilating the hydraulic line. In other solutions, the handlebar stem itself is already of a complex, for example multi-part construction, its assembly is laborious, and the system is accordingly less stable.

It is therefore an object of the present invention to provide an improved solution, in particular with respect to the assembly outlay of the handlebar stem, for the integrated guidance of brake or gear cables.

Said object is achieved by the independent claims. Advantageous configurations and refinements are specified in the dependent claims.

The present invention provides a handlebar stem core for a bicycle, comprising a rear-side steer tube receptacle which is provided to substantially completely enclose and/or clamp or enclose in a clamping manner the steer tube, in particular at its top end (e.g. threadless headset). The handlebar stem core further comprises a front-side handlebar receptacle for receiving and mounting a handlebar, which usually runs transversely on the handlebar receptacle, and a handlebar stem tube, which lies between the steer tube receptacle and the handlebar receptacle and usually has a longitudinal axis running substantially in the direction of travel. In this case, the handlebar stem core according to the invention or the handlebar stem is provided or configured for an integrated guidance of a number n of cables, in particular for all the cables running between the handlebar and the bicycle frame.

The guidance of the number n of cables takes place along the handlebar stem tube usually between a steer tube receptacle side of the handlebar stem tube or a front side of the steer tube receptacle or, in the attached state, between the front, usually bottom, side of the steer tube that faces the bicycle frame on the one hand, and on the other hand a handlebar side of the handlebar stem tube or a rear side of the handlebar receptacle or an attached handlebar.

Here, guided cables run directly on, or at least in the immediate vicinity of the handlebar stem core or the handlebar stem tube, such that they can be concealed and thus integrated, at least using one or more (non-load-bearing) coverings or covers which is/are preferably not structural or only negligibly structural. At the handlebar stem tube, the distance of the number n of cables from the handlebar stem tube preferably amounts to continuously less than 5 mm, 3 mm or 1 mm. In the simplest case, the guided cables in certain sections or continuously bear directly against the surface of the handlebar stem core and/or of the handlebar stem tube and/or run for example continuously or in certain sections in cutouts, such as grooves, depressions, through-holes, etc., which are formed in the handlebar stem core or handlebar stem tube or in the surface thereof, as a result of which a guidance of the cables without play and a covering of the cables or of the handlebar stem core for the purposes of realizing the integrated guidance can easily be achieved.

According to the invention, the handlebar stem core or the handlebar stem is configured for (direct) attachment to respectively one cable central section or to respective cable central sections of the number n of cables (e.g. from the side), that is to say for directly inserting or laying the cable central sections in the or on the handlebar stem core or handlebar stem, wherein cable central section is understood to mean a continuous section of a cable that does not comprise an end or some other kind of interruption of the cable, or that is spaced apart from the cable ends.

In this case, the handlebar stem core is also configured to make an integrated guidance possible and for this purpose comprises, for the number n of cables, preferably for each of the n cables, in, on and/or along the handlebar stem core or the handlebar stem tube, continuously or in certain sections, (respectively) exactly a number m of open cutouts for the guidance of the number n of cables or for the guidance of the respective cable, such as grooves, depressions, through-holes, etc., wherein m is equal to 1, 2 or greater. Here, the n cables run in the m open cutouts respectively individually or together.

In this case, the m open cutouts, such as grooves, depressions, through-holes, provided for guidance of the number n of cables respectively do not have a completely closed wall, such that cable ends do not have to be threaded through. Rather, all the m open cutouts (grooves, depressions, through-holes, etc.) provided for guidance of the number n of cables have an open structure, or an incompletely closed wall with at least one wall opening for example, which allows for example the number n of cables to be introduced or inserted by means of their respective cable central sections, for example sequentially, into the respective cutout. In other words it is provided that, when being used as intended, the number n of cables from geometric and mathematic perspectives runs completely on an outer side or outer surface of the handlebar stem core, which can be inwardly indented, recessed or curved in order to form the number m of open cutouts. As already mentioned, it is therefore not necessary to thread cable ends through a cutout, for example a through-hole, with a (completely) closed wall in order to realize an integrated guidance. Accordingly, the handlebar stem core according to the invention can be attached to and removed from cables which are already present, run between the handlebar and the head tube or the bicycle frame and are already assembled for example at the respective ends, without the cables having to be disassembled at one of the cable ends. Accordingly, the handlebar stem or the handlebar stem core can be easily exchanged, in order for example to change or adapt the geometry of the bicycle. Consequently, for example, when the handlebar stem or the handlebar stem core is being exchanged, a multiplicity of work steps can be eliminated, such as disassembly of one of the cable ends and optionally associated components, re-laying and assembly of the cable end, and realignment of the respective functional groups, such as brake mechanism, gearshift mechanism, ventilation of hydraulic lines, etc.

In the present case, a handlebar stem core is understood to be the mechanically load-bearing part of a handlebar stem, that is to say its structural core or the load-bearing structure of the handlebar stem. Consequently, in the simplest case, the handlebar stem core is the only and/or sole load-bearing part of the handlebar stem that optionally further comprises (non-load-bearing) coverings or covers. In this case, the handlebar stem core is preferably formed in one piece, since this facilitates a best possible ratio of weight to stability.

Furthermore, the number n of cables is a whole number and equal to 1, 2, 3, 4 or greater than 4. The number n of cables is preferably two, preferably mechanical gear cables and/or two, preferably hydraulic brake cables or brake lines. Accordingly, the number n of cables consists of some or all the cables between the handlebar and the bicycle frame, for example of the two gear cables and/or of the two brake cables.

As mentioned, the wall openings of the number m of open cutouts, such as through-holes, is/are formed such that the number n of cables can be introduced by means of their respective cable central sections into the respective cutout. Accordingly, the wall openings have an opening width of at least or exactly 6 mm, 7 mm, 8 mm or 10 mm and/or is/are formed as straight. In the simplest case, it is a question of (straight) slots or passage slots. If an open cutout is formed to receive a plurality of cables, the cables can thus be introduced for example individually or successively into the cutouts.

In one preferred configuration, the handlebar stem core has at least or exactly one preferably cylindrical and/or straight through-hole, which is preferably provided to receive the number n of cables and/or has a diameter in the range of 12 to 25 mm, which preferably amounts to 12, 15, 20 or 25 mm, wherein each of the stated values can also be an upper or lower limit of the stated value range. Here, the through-hole forms one of the m open cutouts, wherein m can be equal to 1. The through-hole preferably has an axis or longitudinal direction that lies in a plane comprising the axis of the steer tube receptacle and preferably an axis of the handlebar stem tube, that is to say optionally lies in an at least substantially vertical (in the intended arrangement of the handlebar stem core or of the handlebar stem on the bicycle or bicycle frame) plane of symmetry of the handlebar stem core, and that particularly preferably runs parallel to the axis of the steer tube receptacle, such that the through-hole is an at least substantially vertical through-hole. The through-hole is preferably formed exclusively in the handlebar stem tube, preferably at a steer tube receptacle-side end of the handlebar stem tube. The through-hole further preferably has a continuous wall opening, which connects the through-hole to the steer tube receptacle, in particular the rear side of the through-hole to the front side of the steer tube receptacle, and is provided for receiving or for (sequentially) guiding through the cable central sections of the number n of cables. Here, the wall opening in the simplest case is in the form of a straight slot and/or the longitudinal or slot direction of the wall opening is preferably formed parallel to the axis of the steer tube receptacle. Accordingly, the wall opening is optionally formed in the vertical plane of symmetry of the handlebar stem core. Furthermore, the smallest distance of the inner walls from the through-hole and the steer tube receptacle, that is to say the depth of the wall opening or the dimension of the wall opening in the direction of the longitudinal axis of the handlebar stem tube, is preferably in the range between 2 to 20 mm and amounts to for example 2, 5, 10, 15 or 20 mm, wherein each of the stated values can also be an upper or lower limit of the stated value range.

Consequently, the through-hole connects in the simplest case two sides of the handlebar stem tube that face away from one another, in particular (in the intended arrangement of the handlebar stem core or of the handlebar stem on the bicycle or bicycle frame) the top and the bottom side of the handlebar stem tube, and accordingly has two axial ends. In this case, the through-hole is preferably widened and/or rounded at a front side, directed toward the handlebar receptacle, of exactly one of the two axial ends (specifically the axial end which, in the intended arrangement of the handlebar stem core, is directed toward the top side of the handlebar stem tube) or at the front side of the two axial ends in the direction of the handlebar receptacle, such that a minimum radius of flexion, resulting at the axial end of the passage opening, for the number n of cables is maximized and nevertheless the n cables can be guided directly on the handlebar stem core and/or in a manner adjoining the through-hole to an outer side, in particular the top side of the handlebar stem tube. This allows or is conducive to the use of mechanical cables, such as gear and/or brake cables, wherein at the same time the desired integrated guidance of the n cables can be ensured using one or more coverings which cover the through-hole and optionally further open cutouts and/or the n cables. This can be achieved by a common rounded portion for the number of n cables as a whole or by n rounded portions, for example in the form of cutouts, depressions, slots, etc., for respectively one of the n cables. The (minimum) radius of flexion of the common rounded portion or of the n rounded portions, which are preferably formed in or symmetrically with respect to the vertical axis of symmetry of the handlebar stem tube, preferably amounts to exactly or at least 10 mm, 12 mm, 15 mm, 20 mm or 30 mm.

The steer tube receptacle of the handlebar stem core preferably has a further, likewise continuous wall opening, which connects the inner side of the steer tube receptacle to an outer side of the handlebar stem core and through which one or more of the number n of cables can be introduced by means of their respective cable central sections optionally sequentially into the steer tube receptacle, and then for example also further into the through-hole. Consequently, the steer tube receptacle (also) forms an open cutout. Accordingly, this further wall opening also preferably has an opening width of at least or exactly 6 mm, 7 mm, 8 mm or 10 mm and/or is formed as straight or is in the form of a slot, in particular parallel to the axis of the steer tube receptacle, and/or is formed on the rear side of the steer tube receptacle that faces away from the handlebar stem tube, in particular in the vertical plane of symmetry of the handlebar stem core.

In this case, it is further preferably provided that this wall opening is provided with fixing means, for example two screws, which realize the clamping of the steer tube receptacle to the steer tube in a manner known per se.

The handlebar stem core preferably has exactly one or more, for example n open cutouts, in particular one or more grooves or slots, which connects an outer face of the handlebar stem tube, preferably the top side of the handlebar stem tube, to the handlebar receptacle. As a result, an integrated guidance of the number of n cables into the handlebar is made possible.

The handlebar stem tube of the handlebar stem core, for example on its top side and/or bottom side, preferably has one or more open cutouts, in particular in the form of a groove or a plurality of grooves, which preferably open out into the through-hole and/or into the handlebar receptacle. This additionally supports an integrated guidance of the cables without play.

Furthermore, the handlebar stem core can also comprise one or more through-holes with a closed wall, as a result of which the design of the handlebar stem core can be adapted to the type of the cable to be guided. For example, in the case of electrical cables or wires, it is easily possible to thread their cable ends through a through-hole of this type with a closed wall, since the disassembly and re-assembly is generally simple and does not require re-alignment, for example.

For attachment to a steer tube, the handlebar stem core is preferably provided with a diameter in the range of 20 to 40 mm, in particular a diameter of 25.4 mm, 28.6 mm or 31.8 mm. Accordingly, the steer tube receptacle of the handlebar stem core preferably has a corresponding diameter in the range of 20 to 40 mm, in particular a diameter of 25.4 mm, 28.6 mm or 31.8 mm, optionally increased by an assembly play of for example 0.1 to 0.5 mm and/or by the assembly space of further components provided between the steer tube receptacle and the steer tube, such as the steer tube sleeve described below.

The invention further relates to a handlebar stem core kit with a handlebar stem core as described above, and with a steer tube sleeve and a filling component for the wall opening between the through-hole and the steer tube receptacle.

Here, the steer tube sleeve is preferably a cylindrical sleeve with an axially continuous cutout or a clamping slot, wherein the internal diameter of the steer tube sleeve corresponds to the external diameter of the steer tube, on which the handlebar stem core kit or the handlebar stem is provided for the purposes of fastening, and wherein the external diameter of the steer tube sleeve corresponds to the internal diameter of the steer tube receptacle of the handlebar stem core. The steer tube sleeve preferably comprises a radial, outwardly directed crimping, which serves to position the steer tube sleeve along the axis of the steer tube receptacle, at one of its axial ends that comes to lie on the top side of the steer tube and the steer tube receptacle in the intended arrangement on the bicycle. Accordingly, during the assembly of the handlebar stem or of the handlebar stem core, the steer tube sleeve can be slid in between the steer tube and the steer tube receptacle.

The filling component is—as mentioned previously—provided for inserting into the wall opening between the through-hole and the steer tube receptacle. Accordingly, the filling component corresponds to this wall opening and has a dimension, referred to below as the width, which corresponds to the width of the wall opening, optionally less an assembly play in the range of for example 0.1 to 0.5 mm. In the simplest case, the filling component is of a cuboidal form. Accordingly, the wall opening is thus filled between the steer tube receptacle and the through-hole by the filling component, and thus supports the mechanical stability when clamping the steer tube receptacle to the steer tube, for example using the rear-side clamping or wall opening of the steer tube receptacle.

The filling component preferably has an engagement means, in particular in the form of a lug, which is preferably arranged on an edge of the filling component that runs in the width direction for the purposes of engagement on the steer tube sleeve, preferably at an axial end of the steer tube sleeve, particularly preferably at the radial crimping of the steer tube sleeve. Accordingly, in the intended arrangement, the lug of the filling component presses onto the top axial end of the steer tube sleeve, as a result of which the steer tube sleeve can be fixed or secured against a movement along the axis of the steer tube receptacle, in particular upwardly, that is to say in the direction away from the steer tube.

The filling component itself is preferably secured against a movement within the wall opening of the handlebar stem core, in particular along the axis of the steer tube receptacle. For this purpose, the filling component has for example an opening, in particular a through-hole, the longitudinal axis of which runs in the direction of the width of the filling component, out of, through which opening a securing screw runs, the axis of which runs in the width direction or, in the intended arrangement, in the circumferential direction of the steer tube receptacle and/or which is screwed inside the handlebar stem core.

The steer tube sleeve and the filling component can be a common, one-piece component, which can then be secured preferably using the above-described securing screw against a movement along the axis of the steer tube receptacle. Accordingly, in this case, the engagement means or the engagement lug of the filling component can be dispensed with. However, it is more conducive in terms of manufacture and accordingly cost to provide these components as two separate components, wherein, before the installation, these two components can be joined together, for example fixedly connected to one another, to form a common, thus unipartite component.

The invention also relates to a handlebar stem which comprises a handlebar stem core or handlebar stem core kit as described above. In this case, the handlebar stem preferably additionally comprises one or further, preferably non-structural or planar and/or mechanically non-load-bearing coverings for realizing the desired integrated cable guidance, that is to say for preferably completely concealing or protecting the number n of cables, as well as optionally further cables, the number m of cutouts, such as the through-hole, as well as optionally further cutouts. As a result, not only is an esthetic appearance of the handlebar stem ensured, but also improved protection of the brake and/or gear cables against environmental influences is ensured. The one or more coverings preferably do not contribute to the mechanical stability of the handlebar stem.

The invention further comprises a bicycle, such as for example a racing bicycle, a mountain bike, an e-bike, an urban bike, etc. with a handlebar stem core, handlebar stem core kit or handlebar stem as described above. The bicycle further comprises a number n of cables, which run in a guided and integrated manner between a head tube of the bicycle frame of the bicycle and a handlebar. In particular, the guided cables in certain sections or continuously bear directly against the surface of the handlebar stem core or of the handlebar stem tube and/or the cables are preferably completely concealed and/or protected by the one or the plurality of coverings.

The number of n cables is, for example, all the cables, in particular the four cables, that usually run between the handlebar and the bicycle frame, specifically two gear cables and two brake cables, wherein the gear cables are preferably mechanical gear cables and the brake cables are hydraulic or likewise mechanical brake cables or brake lines. As an alternative, the number n of cables can be, for example, exactly two cables, specifically preferably two gear cables or two brake cables.

BRIEF DESCRIPTION OF THE DRAWINGS

Further advantages of the invention are described below with reference to the exemplary embodiment illustrated in the accompanying figures. The exemplary embodiment represents a preferred embodiment, which does not restrict the invention in any way. The figures shown are schematic representations which do not necessarily reflect the real proportions but serve for improved clarity of the exemplary embodiment. In detail, in the figures:

FIG. 1 schematically shows a perspective exploded view of an exemplary embodiment of a handlebar stem. FIG. 2 represents a perspective side view of a cut-away handlebar stem core for the purposes of clarifying the cable guidance.

Figure 1:
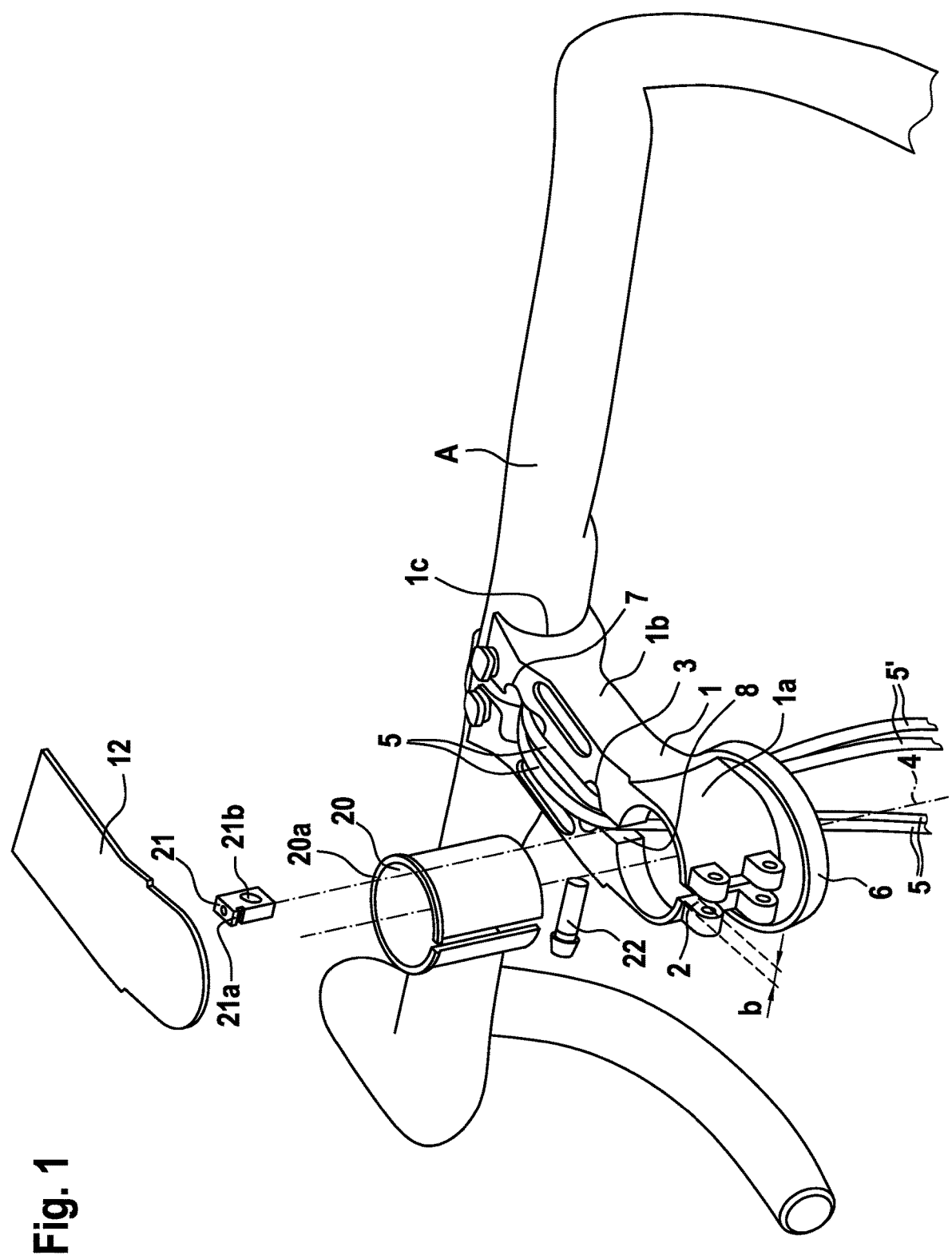
FIG. 1 shows a perspective exploded view of the exemplary embodiment of a handlebar stem according to the invention with guided cables.
Figure 2:
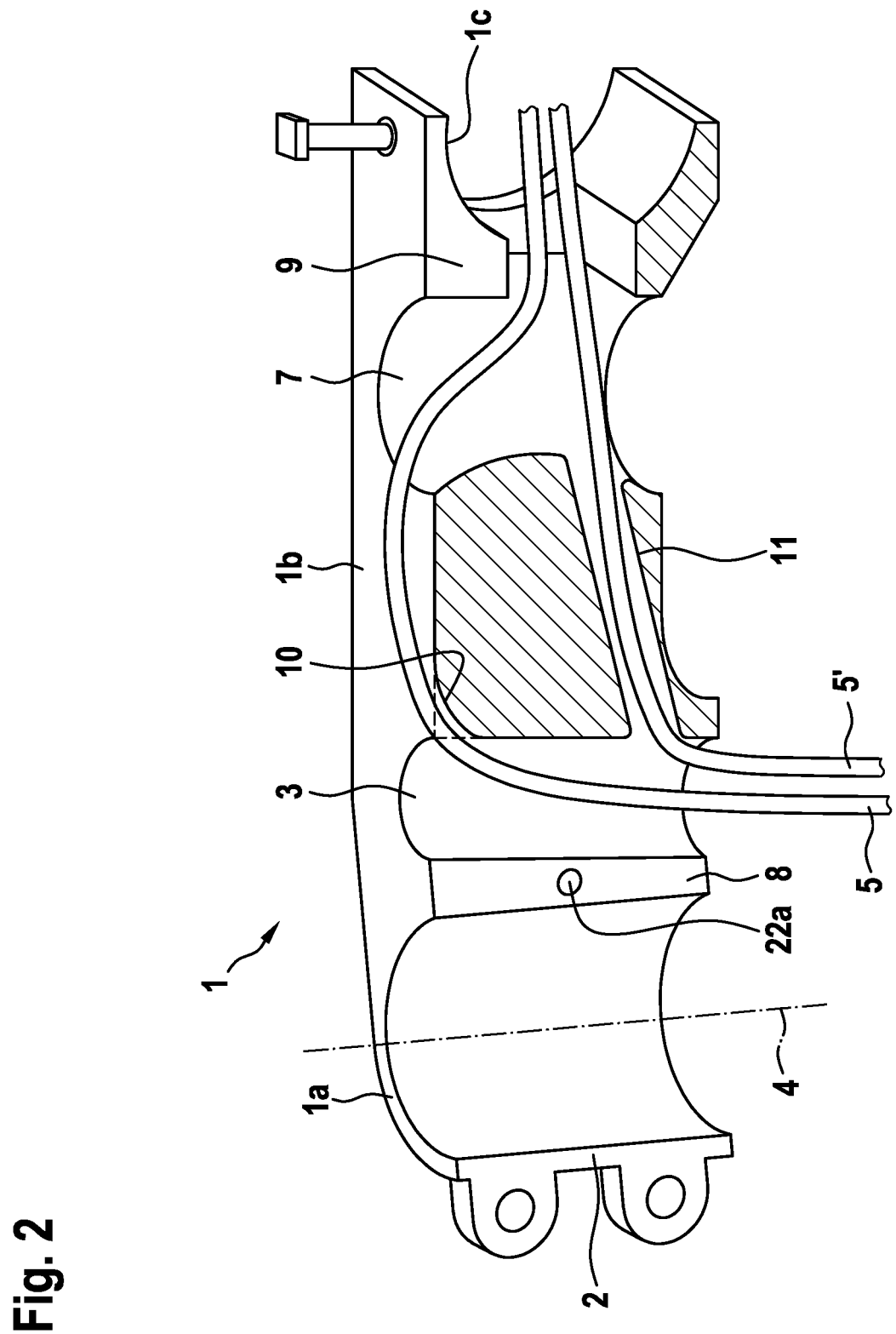
FIG. 2 shows a perspective view of a cut-away handlebar stem core with inserted cables.

The handlebar stem connects a steer tube (not represented) of a bicycle fork to a handlebar A, wherein the handlebar stem has a handlebar stem core 1, which in the exemplary embodiment represented is formed in one piece and fully produces the mechanically load-bearing connection between the steer tube and the handlebar A. For this purpose, the handlebar stem core 1 comprises a steer tube receptacle 1a, a handlebar receptacle 1c, and a handlebar stem tube 1b lying in between. Here, the steer tube receptacle 1a is provided in a manner known per se for clamping to the steer tube (in the present case, using two screws) and accordingly comprises a rear clamping slot 2 which faces away from the handlebar stem tube 1b. Formed in the handlebar stem tube 1b is a through-hole 3, which in the present exemplary embodiment extends parallel to the axis 4 of the steer tube receptacle 1a and consequently connects the top side and bottom side of the handlebar stem tube 1b of the handlebar stem core 1. Said substantially vertical through-hole 3 is provided for the purposes of receiving in the present case two cables 5 and allows the two cables 5 to be guided out of a front side of a head tube (not represented) of the bicycle frame, in the present case through a cover disk 6, to the top side of the handlebar stem tube 1b or of the handlebar stem core 1. The two cables run proceeding from the through-hole 3 subsequently to the top side of the handlebar stem core 1 or of the handlebar stem tube 1b. The handlebar stem tube 1b further comprises, on its side facing the handlebar receptacle 1c, a further cutout 7 which serves to guide the two cables 5 into the handlebar A. This guidance over the top side of the handlebar stem tube 1b allows the flexion of the cables 5 in the handlebar stem core 1 to be minimized or their minimum radius of flexion to be maximized.

Here, the through-hole 3 is connected via a wall opening 8 to the steer tube receptacle 1a and via a further wall opening 2 in the form of the clamping slot 2 to the outer side in such a manner that the cables do not have to be threaded through the through-hole 3 by means of a cable end, but that the cable central sections of the cables 5 can be introduced directly into the through-hole 3. Similarly, the cutout 7 on the front side of the handlebar stem tube 1b has a vertical wall opening, which likewise allows the inserting of cable central sections of the cables 5. Consequently, the handlebar stem core 1 represented or the handlebar stem as a whole can be assembled on cables already assembled in the handlebar A on the one hand and in the bicycle on the other hand, without making it necessary to release the cables or disassemble the cable ends. Accordingly, the wall openings 2, 8 and 9 have a width of 6 mm in the present case, which allows the guiding through of the cable central sections both of brake cables and of gear cables, which have a standard external diameter of 5.8 mm.

For the handlebar stem core 1, for the purposes of improving the mechanical stability of the clamping on the steer tube, or else for complying with regulatory guidelines, a cylindrical steer tube sleeve 20 with clamping slot, a filling component 21 for introducing into the wall opening 8, and a securing screw 22 for fixing the filling component 21 in the wall opening 8 are further provided. Here, the filling component 21 in the present case completely fills the wall opening 8, is of an accordingly cuboidal form, has a length which corresponds to the height of the handlebar stem core 1 and has a width which corresponds to the width b of the wall opening, in the present case 6 mm. The filling component 21 has a through-hole 21b, through which runs the securing screw 22, which also runs in the hole 22a of the handlebar stem core 1 which on the screw head side of the securing screw 22 is in the form of a screw hole and on the opposite side is in the form of a threaded hole.

The steer tube sleeve 20 is introduced between the steer tube and the steer tube receptacle 1a and likewise serves to improve the mechanical stability of the clamping. Provided at the top side of the steer tube sleeve 20 is a radially outwardly directed crimping 20a, which positions the steer tube sleeve 20 within the steer tube receptacle 1a. Furthermore, on one of the top edges facing the steer tube sleeve 20, the filling component 21 has a projection 21a in the form of a lug, by means of which the steer tube sleeve 20 is additionally held within the steer tube receptacle 1a.

In order to further maximize the minimum flexion of the cables 5, provided on the top front side of the through-hole 3 is a rounded portion 10, which connects the through-hole to the top side of the handlebar stem tube 1b and against which the cables 5 are laid.

In the present exemplary embodiment, further provided on a bottom side of the handlebar stem tube is a through-hole 11 with a closed wall, in which through-hole two further cables 5' (only one cable is represented in the figures) are guided from the head tube of the bicycle through the handlebar stem core 1 to the handlebar A or from the through-hole 3 to the cutout 7.

In the present exemplary embodiment, the complete handlebar stem further comprises a non-load-bearing covering 12, which is provided for the top side of the handlebar stem core 1 and in the present case covers the entire top side of the handlebar stem core 1 and consequently ensures an integrated guidance of the cables 5, 5'.

LIST OF REFERENCE SIGNS

A Handlebar
1 Handlebar stem core
1a Steer tube receptacle
1b Handlebar stem tube
1c Handlebar receptacle
2 Clamping opening/wall opening
3 Through-hole
4 Axis of the steer tube receptacle
5, 5' Cable, brake cable, gear cable
6 Cover disk
7 Cutout
8 Wall opening
9 Wall opening
10 Rounded portion
11 Through-hole
12 Covering
20 Steer tube sleeve
20a Crimping
21 Filling component
21a Lug, engagement lug
21b Through-hole
22 Securing screw
22a Screw hole

The invention claimed is:

1. A handlebar stem core for a handlebar stem of a bicycle, comprising
a rear-side steer tube receptacle,
a front-side handlebar receptacle and
a handlebar stem tube lying in between,
the handlebar stem tube comprising:
at least one first open cutout adjacent the rear-side steer tube receptacle, the first open cutout comprising a wall opening between the first open cutout and the rear-side steer tube receptacle, and
at least one second open cutout adjacent the front-side handlebar receptacle, the second open cutout comprising a wall opening between the first open cutout and the front-side handlebar receptacle,
wherein the handlebar stem core is formed for the integrated guidance of one or more cables, through the wall openings and cutouts, and wherein the handlebar stem core is configured for attachment to a cable central section of the cables.

2. A handlebar stem core according to according to claim 1, wherein the wall opening has an opening width (b) of at least or exactly 6 mm, 7 mm, 8 mm or 10 mm and/or is formed as straight or is in the form of a slot.

3. A handlebar stem core according to claim 1, wherein the handlebar stem core is formed in one piece.

4. A handlebar stem core according to claim 1, further comprising a through-hole, wherein the through-hole:
has an axis or longitudinal direction that lies in a plane comprising an axis of the steer tube receptacle and runs parallel to the axis of the steer tube receptacle,
is formed within the handlebar stem tube, at a steer tube receptacle-side end of the handlebar stem tube, and/or
has a wall opening, which connects the through-hole to the steer tube receptacle,
wherein the wall opening is in the form of a straight slot and/or is formed parallel to the axis of the steer tube receptacle, and/or wherein the distance of the inner walls from the through-hole and the steer tube receptacle is in the range between 2 and 20 mm.

5. A handlebar stem core according to claim 4, wherein the through-hole has one or more rounded portions on a front side of at least one of its axial ends and/or is widened and/or rounded in the direction of the handlebar receptacle, such that a minimum radius of flexion amounts to at least or exactly 10 mm, 20 mm, or 30 mm.

6. A handlebar stem core according to claim 1, wherein the wall opening connects the inner side of the steer tube receptacle to an outer side of the handlebar stem core and has an opening width (b) of at least or exactly 6 mm, 7 mm, 8 mm or 10 mm and/or is formed as straight or is in the form of a slot and/or is formed on the rear side of the steer tube receptacle.

7. A handlebar stem core according to claim 1, wherein the handlebar stem core has at least one open cutout, which connects an outer face of the handlebar stem tube to the handlebar receptacle.

8. A handlebar stem core according to claim 1, wherein the handlebar stem tube, on its top side and/or bottom side, has one or more open cutouts, in particular in the form of a groove or a plurality of grooves, which open out into one or more of the open cutouts, into the through-hole and/or into the handlebar receptacle.

9. A handlebar stem core kit, comprising:
a handlebar stem core according to claim 1, and
a steer tube sleeve and a filling component, which are in the form of a one-piece component or two different components.

10. A handlebar stem core kit according to claim 9, wherein the steer tube sleeve is in the form of a cylindrical clamping sleeve with an axial clamping slot and, at one of its axial ends, has a radial crimping which is directed outwardly.

11. A handlebar stem core kit according to claim 10, wherein the filling component corresponds to the wall opening between the through-hole and the steer tube receptacle and is of a cuboidal form and/or has a lug, for the purposes of engagement on the steer tube sleeve, an axial end of the steer tube sleeve, and/or a through-hole for receiving a screw.

12. A bicycle according to claim 9, comprising four cables, two, of which are mechanical gear cables and two of which are, hydraulic brake cables or brake lines.

13. A handlebar stem, comprising a handlebar stem core according to claim 1, and exactly one or more coverings for completely concealing at least the one or more cables.

14. A bicycle, in the form of a racing bicycle, mountain bike, e-bike, or an urban bike, the bicycle comprising:
a handlebar stem core according to claim 1,
and further comprising a number of cables, which run in a guided manner between a head tube of a bicycle frame of the bicycle and a handlebar, in such a manner that the guided cables in certain sections or continuously bear directly against the surface of the handlebar stem core and/or of the handlebar stem tube and/or are concealed and/or protected, completely, by the one or more coverings.

* * * * *